(12) United States Patent
Pineda et al.

(10) Patent No.: US 12,388,212 B2
(45) Date of Patent: Aug. 12, 2025

(54) FASTENERS FOR ELECTRICAL CONNECTORS OF A VEHICLE

(71) Applicant: GM GLOBAL TECHNOLOGY OPERATIONS LLC, Detroit, MI (US)

(72) Inventors: Ricardo Pineda, Zinacantepec (MX); Daniel Ruiz, Monterrey (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 405 days.

(21) Appl. No.: 18/163,384

(22) Filed: Feb. 2, 2023

(65) Prior Publication Data

US 2024/0266775 A1    Aug. 8, 2024

(51) Int. Cl.
*H01R 13/506* (2006.01)
*H01R 13/502* (2006.01)

(52) U.S. Cl.
CPC ....... *H01R 13/506* (2013.01); *H01R 13/5025* (2013.01); *H01R 2201/26* (2013.01)

(58) Field of Classification Search
CPC .............. H01R 13/506; H01R 13/5025; H01R 2201/26; H01R 13/74; H01R 13/639; H01R 13/631; B60R 16/0215
See application file for complete search history.

(56) References Cited

U.S. PATENT DOCUMENTS

| | | | |
|---|---|---|---|
| 8,763,212 B2 * | 7/2014 | Scroggie | F16B 5/0628 24/297 |
| 10,808,745 B1 * | 10/2020 | Javali | F16B 21/086 |
| 11,692,649 B2 * | 7/2023 | Locatelli | F16L 3/233 248/74.1 |
| 12,024,098 B2 * | 7/2024 | Chen | B60R 13/0206 |

* cited by examiner

*Primary Examiner* — Briggitte R. Hammond
(74) *Attorney, Agent, or Firm* — CANTOR COLBURN LLP

(57) ABSTRACT

A fastener for electrical connector a vehicle is provided. The fastener includes a first component including a snap, an engagement surface and a connector. The first component is configured to removably affix to the electrical connector. The fastener also includes a second component including a protrusion, wherein the first component is disposed on top of the second component. The protrusion limits a range of motion of the snap in a direction of the second component.

20 Claims, 6 Drawing Sheets

FASTENERS FOR ELECTRICAL CONNECTORS OF A VEHICLE

INTRODUCTION

The disclosure relates to fasteners, and more particularly to a fastener for an electrical connector of a vehicle.

In general, vehicles include many different electrical systems. These electrical systems include, but are not limited to, infotainment systems, lighting systems, power steering systems, power braking system, driver assistance systems, various sensors, heating and air conditioning systems, and the like. Each of the electrical systems include numerous wires and connectors that are disposed throughout the vehicle. The wires and connectors are secured to a portion of the vehicle to prevent the wires and connectors from being damaged or interfering with the operations of other components of the vehicle.

SUMMARY

In one exemplary embodiment, a fastener for an electrical connector of a vehicle is provided. The fastener includes a first component including a snap, an engagement surface and a connector, wherein the first component is configured to removably affix to the electrical connector. The fastener also includes a second component including a protrusion, wherein the first component is disposed on top of the second component and wherein the protrusion limits a range of motion of the snap in a direction of the second component.

In addition to the one or more features described herein the second component includes one or more alignment posts.

In addition to the one or more features described herein the first component includes one or more alignment apertures that are configured to receive the one or more alignment posts.

In addition to the one or more features described herein the protrusion includes a first end and a second end and wherein a height of the protrusion at the second end is greater than a height of the protrusion at the first end.

In addition to the one or more features described herein the first component includes an aperture disposed beneath a portion of the snap and wherein at least a portion of the protrusion is configured to extend through the aperture.

In addition to the one or more features described herein the protrusion includes a first end and a second end and wherein a width of the protrusion at the second end is greater than a width of the protrusion at the first end.

In addition to the one or more features described herein the aperture has a tapered shape and wherein the first end of the protrusion and the second end of the protrusion are configured to contact sides of the aperture to aid in alignment of the snap with the protrusion.

In one exemplary embodiment, a vehicle including a fastener for an electrical connector is provided. The fastener includes a first component including a snap, an engagement surface and a connector, wherein the first component is configured to removably affix to the electrical connector. The fastener also includes a second component including a protrusion, wherein the first component is disposed on top of the second component and wherein the protrusion limits a range of motion of the snap in a direction of the second component.

In addition to the one or more features described herein the second component includes one or more alignment posts.

In addition to the one or more features described herein the first component includes one or more alignment apertures that are configured to receive the one or more alignment posts.

In addition to the one or more features described herein the protrusion includes a first end and a second end and wherein a height of the protrusion at the second end is greater than a height of the protrusion at the first end.

In addition to the one or more features described herein the first component includes an aperture disposed beneath a portion of the snap and wherein at least a portion of the protrusion is configured to extend through the aperture.

In addition to the one or more features described herein the protrusion includes a first end and a second end and wherein a width of the protrusion at the second end is greater than a width of the protrusion at the first end.

In addition to the one or more features described herein the aperture has a tapered shape and wherein the first end of the protrusion and the second end of the protrusion are configured to contact sides of the aperture to aid in alignment of the snap with the protrusion.

In one exemplary embodiment, a fastener for an electrical connector of a vehicle is provided. The fastener includes a first component including a snap, an engagement surface and a connector, wherein the first component is configured to removably affix to the electrical connector. The fastener also includes a second component including a protrusion, wherein the first component is disposed on top of the second component and wherein the protrusion limits a range of motion of the snap in a direction of the second component. The snap has a first end connected to the first component and a second end adjacent the engagement surface and wherein the snap has a height that increases from the first end to the second end.

In addition to the one or more features described herein the snap has a width that increases from the first end to the second end.

In addition to the one or more features described herein the protrusion includes a first end and a second end and wherein a height of the protrusion at the second end is greater than a height of the protrusion at the first end.

In addition to the one or more features described herein the first component includes an aperture disposed beneath a portion of the snap and wherein at least a portion of the protrusion is configured to extend through the aperture.

In addition to the one or more features described herein the protrusion includes a first end and a second end and wherein a width of the protrusion at the second end is greater than a width of the protrusion at the first end.

In addition to the one or more features described herein the aperture has a tapered shape and wherein the first end of the protrusion and the second end of the protrusion are configured to contact sides of the aperture to aid in alignment of the snap with the protrusion.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

As discussed above, vehicles include many different electrical systems that each have numerous wires and connectors. The wires and connectors are secured to a portion of the vehicle to prevent the wires and connectors from being damaged or interfering with the operations of other components of the vehicle. Currently available fasteners for electrical connectors can be damaged during service when the electrical connector is removed. In exemplary embodiments, fasteners for electrical connectors are provided which include stops that restrict the movement of a snap as it is depressed during use. By limiting the range of movement of the snap during use of the fastener, damage to the fastener due to material strain can be avoided.

Figure 1:
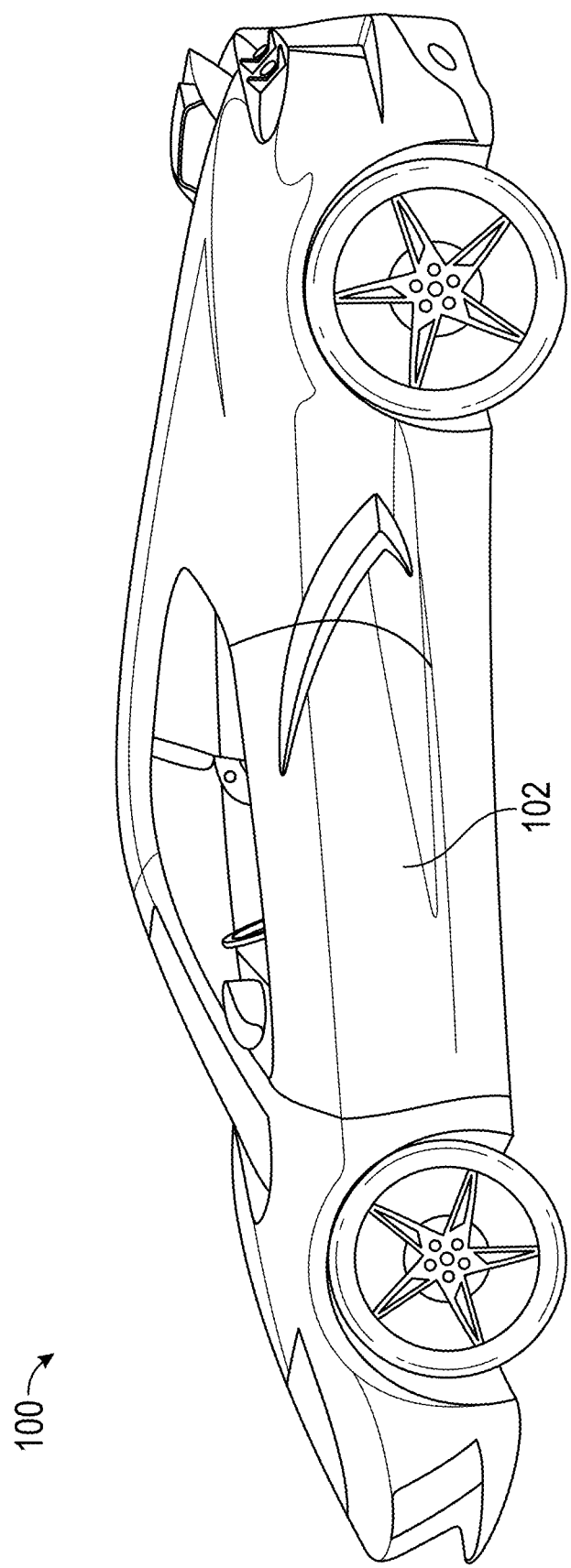
FIG. 1 is a schematic diagram of a vehicle for use in conjunction with one or more embodiments of the present disclosure.
Figure 2A:
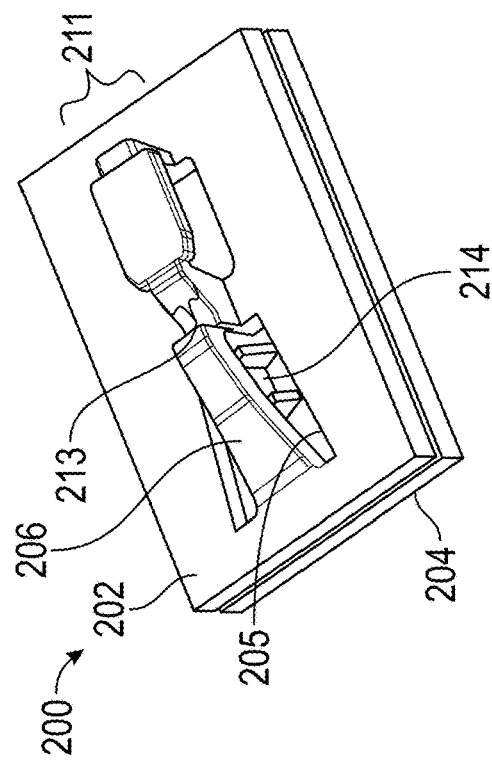
FIGS. 2A, 2B, 2C, and 2D are schematic diagrams illustrating a fastener for an electrical connector for a vehicle in accordance with an exemplary embodiment.
Figure 2C:
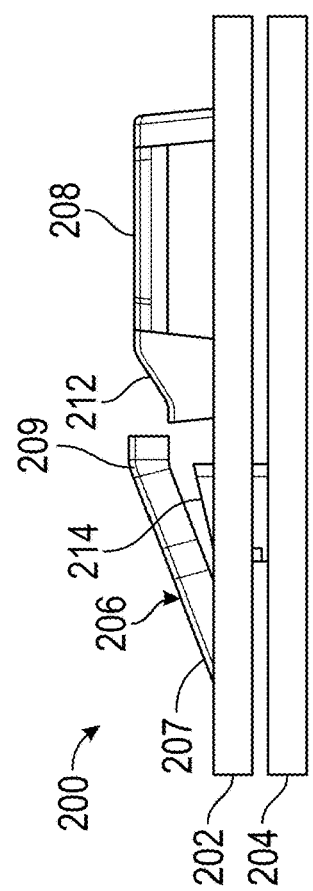
Figure 2B:
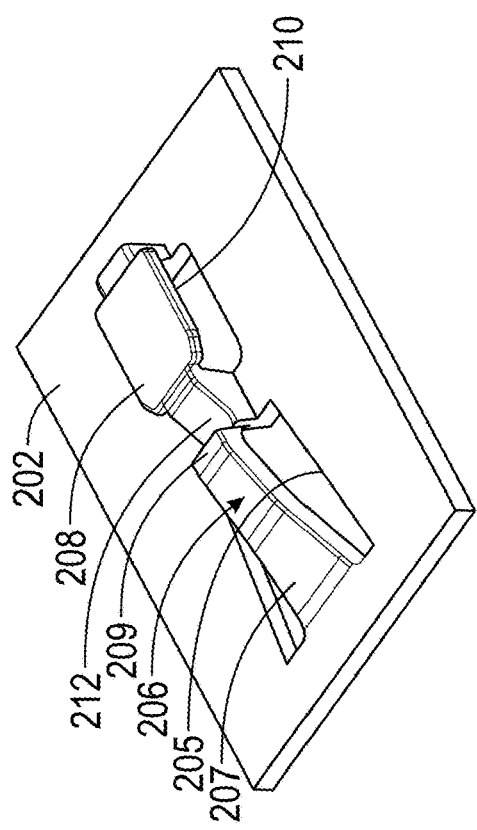
Figure 2D:
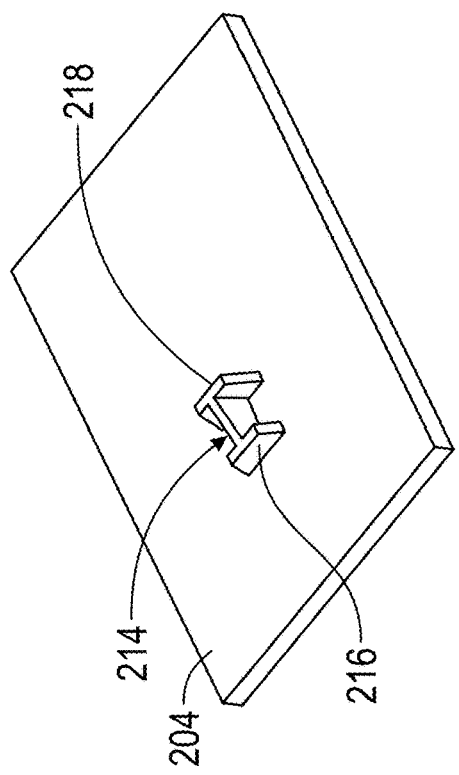

Referring now to FIG. 1, a schematic diagram of a vehicle 100 for use in conjunction with one or more embodiments of the present disclosure is shown. The vehicle 100 includes an electrical system that includes one or more wires and connectors (not shown). In one embodiment, the vehicle 100 includes a door 102 that includes a plurality of electrical connectors that are secured to an inner surface of the door 102 by fasteners (not shown). Although disused primarily in connection with the use in a door, those of ordinary skill will appreciate that the electrical connectors may be secured to any interior surface of a vehicle.

Referring now to FIGS. 2A, 2B, 2C, and 2D schematic diagrams illustrating a fastener 200 for an electrical connector for a vehicle in accordance with an exemplary embodiment are shown. In general, the fastener 200 includes a first component 202 and a second component 204 and the first component 202 is configured to be disposed on top of the second component 204. The fastener 200 is configured to receive an electrical connector (not shown) and prevent the electrical connector from moving.

As illustrated, the first component 202 includes a snap 206 that includes a first end 207 that is affixed to the first component 202 and a second end 209. The snap 206 has a height that generally increases as the snap 206 extends from the first end 207 to the second end 209. In exemplary embodiments, the snap 206 has a width that is wider at the first end 207 than at the second end 209. In one embodiment, the width of the snap 206 decreases as the snap 206 extends from the first end 207 to the second end 209. In another embodiment, the width of the snap 206 is uniform from the first end 207 to the second end 209. In a further embodiment, the width of the snap 206 increases as the snap 206 extends from the first end 207 to the second end 209. In one embodiment, the length of the snap 206 is greater than 20 mm long and the snap has a thickness of 2.5 mm to avoid fracture of the snap 206 and to allow the snap 206 to bend within the permissible strain of the material used to form the snap 206.

The first component 202 also includes an engagement surface 212 adjacent to the second end 209 of snap 206 and a connector 208 disposed on the opposite side of the engagement surface 212 from the snap 206. In one embodiment, a distance between the second end 209 of, the snap 206 and the engagement surface 212 is approximately 0.5 mm. In exemplary embodiments, the engagement surface 212 has a width 213 which is less than the width 211 of the connector 208. In exemplary embodiments, the connector 208 includes side portions 210 that extend outward from the sides of the engagement surface 212.

As illustrated, the second component 204 includes a protrusion 214, which is also referred to herein as a rib 214. The protrusion 214 extends upwardly from the upper surface of the second component 204. In exemplary embodiments, the protrusion 214 has a first end 216 and a second end 218. In one embodiment, the width of the protrusion 214 is smaller at the first end 216 than the width of the protrusion at the second end 218. In one embodiment, the height of the protrusion 214 is shorter at the first end 216 than the height of the protrusion at the second end 218. In exemplary embodiments, the height and shape of the protrusion 214 are determined based on the behavior of the snap 206 when it bends.

The first component 202 also includes an aperture 205 disposed beneath the snap 206. The aperture 205 is configured to receive the protrusion 214 of the second component 204 when the first component 202 is placed on top of the second component 204. The protrusion 214 is configured to limit the movement of the second end 209 of the snap 206 towards the surface of the first component 202, to prevent fatigue and/or failure of the snap 206 when pressed, FIG. 2D. In exemplary embodiments, the protrusion 214 limits the distance that the snap 206 can move towards the upper surface of the second component 204 to less than 2-3 mm to prevent fatigue and/or failure of the snap 206 when pressed. In an exemplary embodiment, the aperture 205 has a tapered shape that is configured to aid in the alignment of the protrusion 214 with the snap 206. In one example, the protrusion 214 has a larger width at the second end 218 than the width at the first end 216 and the sides of the protrusion 214 are configured to come into contact with the sides of the aperture 205 to help properly align the protrusion 214 with the snap 206.

Figure 3A:
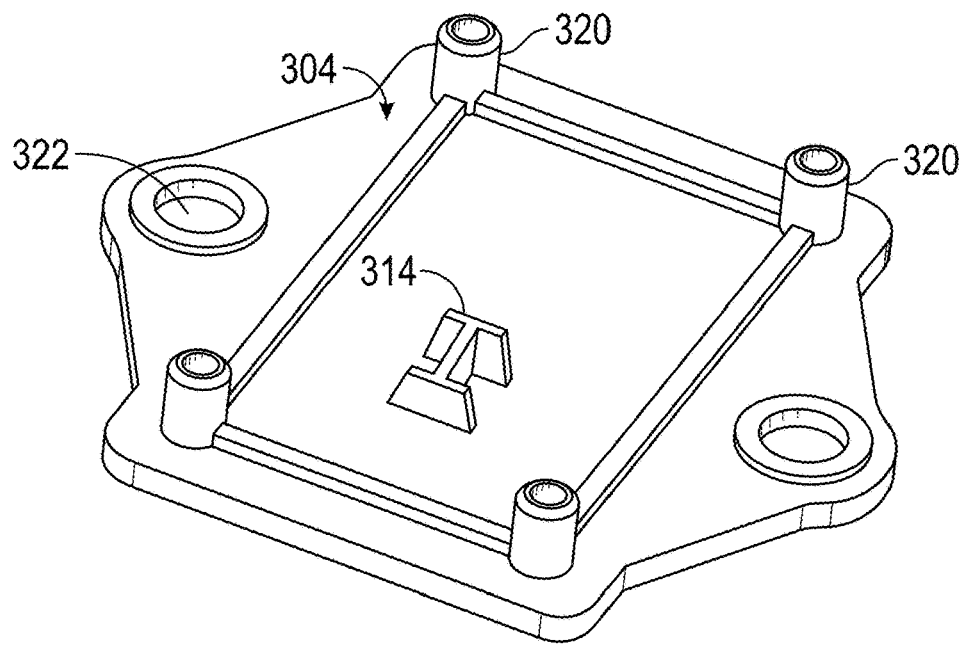
FIGS. 3A and 3B are schematic diagrams illustrating a fastener for an electrical connector for a vehicle in accordance with an exemplary embodiment.
Figure 3B:
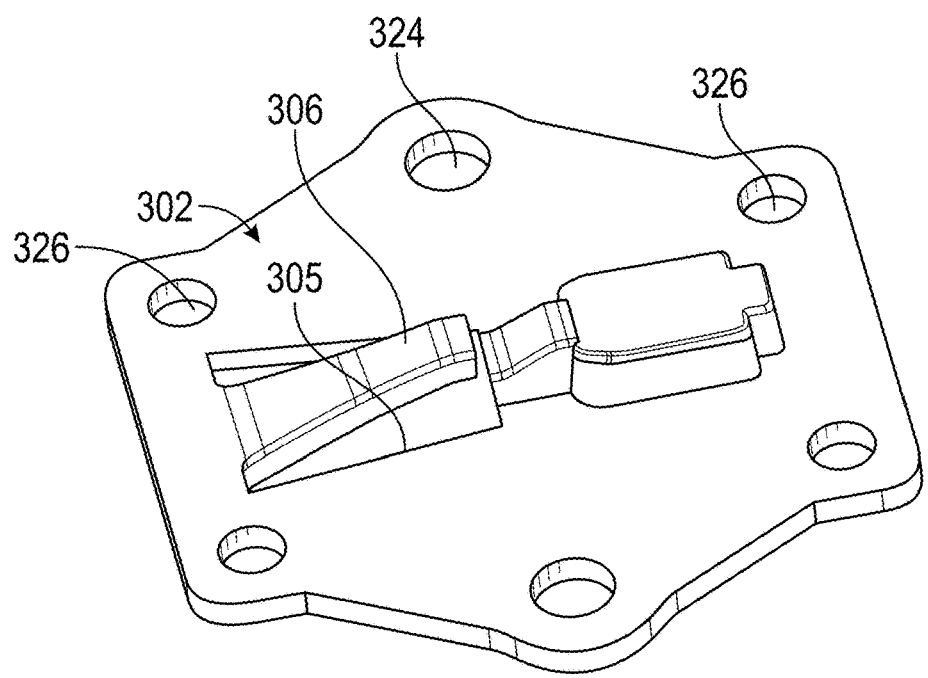

Turning now to FIGS. 3A and 3B schematic diagrams illustrating a fastener for an electrical connector for a vehicle in accordance with an exemplary embodiment are shown. In general, the fastener includes a first component 302 and a second component 304, and the first component 302 is configured to be disposed on top of the second component 304. The first component 302 includes an aperture 305 that is configured to receive a protrusion 314 of the second component 304 when the first component 302 is disposed on top of the second component 304. The protrusion 314 is configured to limit the movement of a snap 306 towards the surface of the first component 302, to prevent fatigue and/or failure of the snap 306 when pressed.

The second component 304 includes one or more alignment posts 320 and apertures 322. The first component 302 includes one or more alignment apertures 326 that are configured to receive the alignment posts 320 when the first component 302 is disposed on top of the second component 304. In exemplary embodiments, alignment apertures 326 and the alignment posts 320 are configured to ensure that the snap 306 is properly aligned with the protrusion 314. In exemplary embodiments, the apertures 324 are configured to overlap with the apertures 322 such that a screw, rivet, or other attachment means can be placed through both the first component 302 and the second component 304 to secure the first component 302 and the second component 304 to a surface (not shown).

Figure 4B:
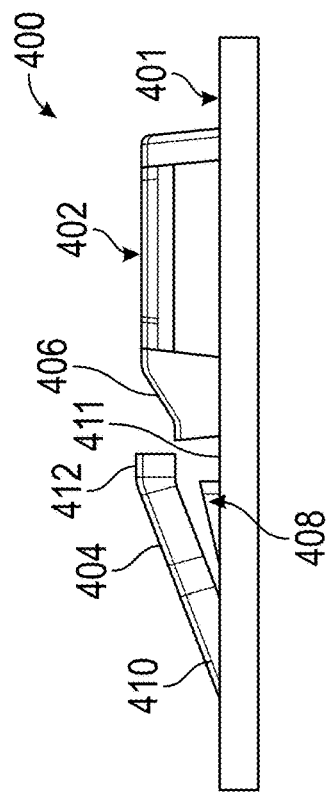
FIGS. 4A and 4B are schematic diagrams illustrating a fastener for an electrical connector for a vehicle in accordance with an exemplary embodiment.
Figure 4A:
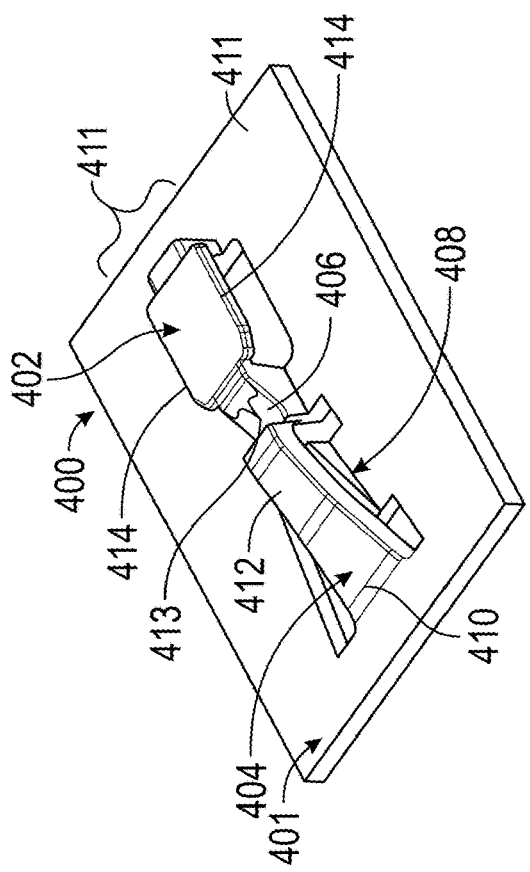

Turning now to FIGS. 4A and 4B schematic diagrams illustrating a fastener 400 for an electrical connector for a vehicle in accordance with an exemplary embodiment are shown. As illustrated, the fastener 400 includes a snap 404, a protrusion 408, an engagement surface 406, and a connector 402. The snap 404 includes a first end 410 that is connected to a body 401 of the fastener 400 and a second end 412 opposite the first end 410. The protrusion 408 is configured to limit the movement of the second end 412 of the snap 404 towards a surface 411 of the fastener 400, to prevent fatigue and/or failure of the snap 404 when pressed. In exemplary embodiments, the engagement surface 406 has a width 413 which is less than the width 411 of the connector 402. In exemplary embodiments, the connector 402 includes side portions 414 that extend outward from the sides of the engagement surface 406.

Figure 5A:
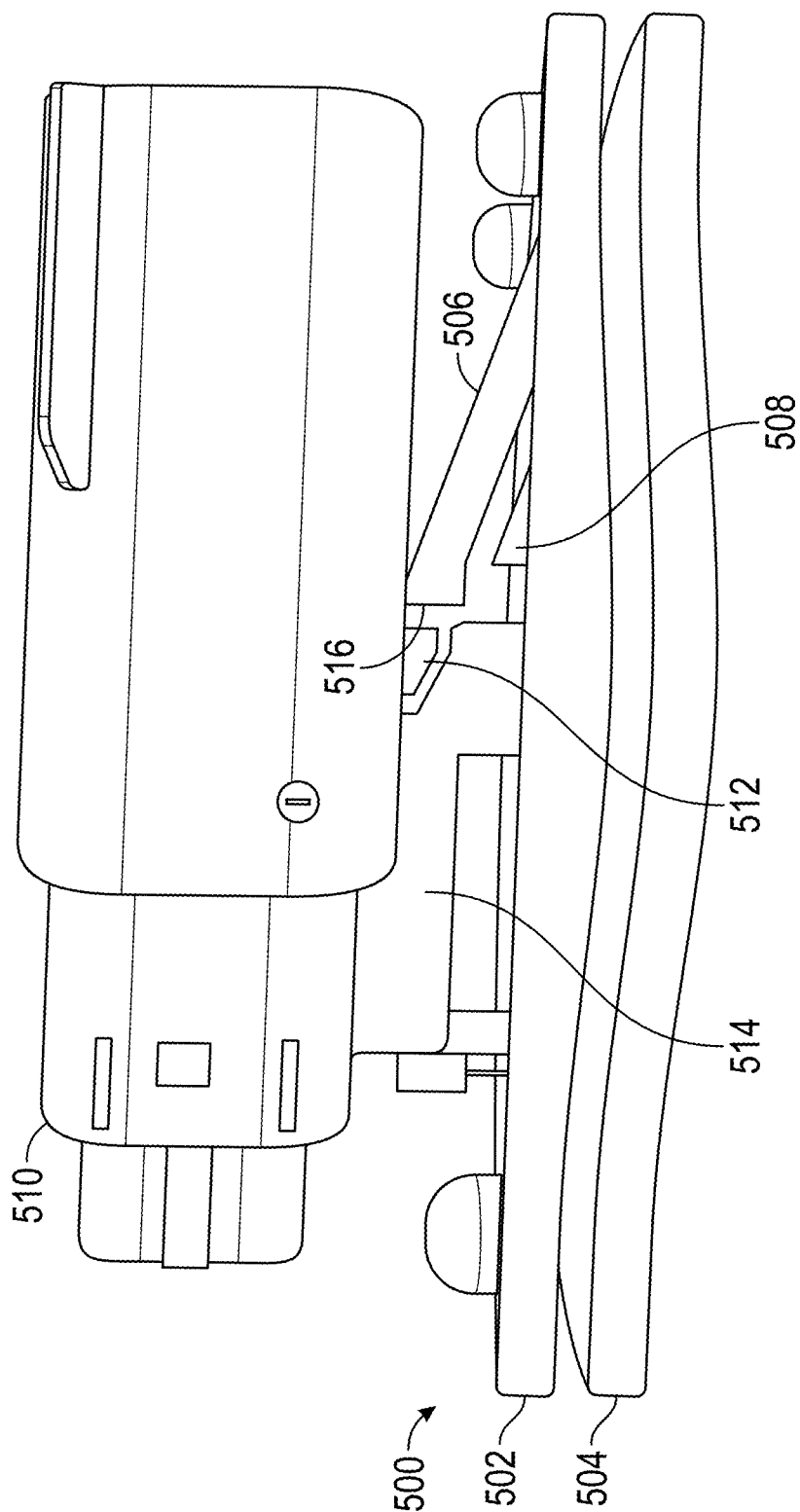
FIGS. 5A and 5B are schematic diagrams illustrating a fastener for an electrical connector for a vehicle in accordance with an exemplary embodiment.
Figure 5B:
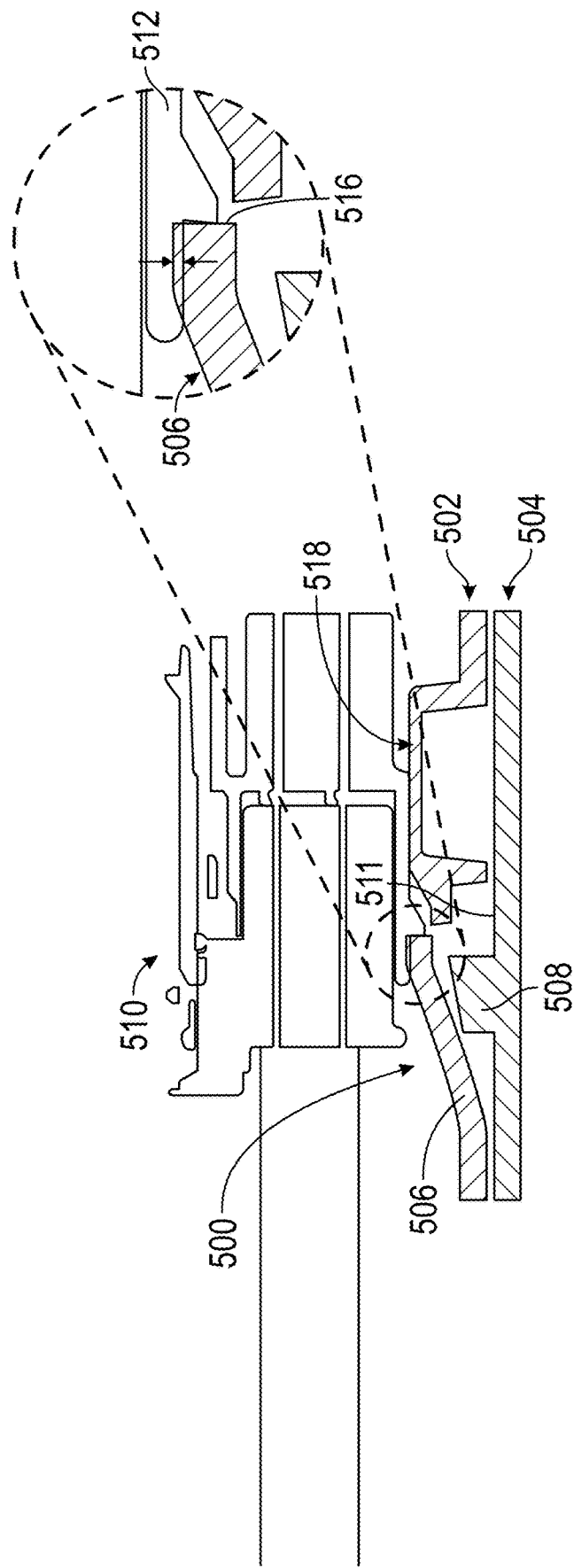

Turning now to FIGS. 5A and 5B schematic diagrams illustrating a fastener 500 for an electrical connector 510 for a vehicle in accordance with an exemplary embodiment are shown. As illustrated, the fastener 500 includes a first component 502 that is disposed on top of a second component 504. The first component 502 includes a snap 506 that is configured to deform towards an upper surface 511 of the second component 504. The second component 504 includes a protrusion 508 disposed beneath the snap 506 that limits the movement of the snap 506 towards the upper surface 511 of the second component 504, to prevent fatigue and/or failure of the snap 506 when pressed. In one embodiment, the length of the snap 506 is approximately 20 mm long and the snap 506 has a thickness of 2.5 mm to avoid any fracture and allow the snap 506 to bend within the permissible strain of the material. In exemplary embodiments, the protrusion 508 limits the distance that the snap 506 can move towards the upper surface 511 of the second component 504 to less than 2-3 mm to prevent fatigue and/or failure of the snap 506 when pressed.

In exemplary embodiments, the electrical connector 510 includes a tab 512 that is configured to depress the snap 506 as the electrical connector 510 is slid onto the fastener 500. In one embodiment, the surface 518 of the first component 502 includes one or more rails that are configured to engage with a lower portion 514 as the connector 510 is slid into place across the snap 506. Once the tab 512 slides past an end 516 of the snap 506. The snap 506 moves in an upward direction, (i.e., away from the second component 504), and prevents the tab 512 from traversing backward across the snap 506. For extraction of the connector 510, the snap 506 needs to be pressed downward until it contacts the ribs 508.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A fastener for an electrical connector of a vehicle comprising:
   a first component including a snap, an engagement surface and a connector, wherein the first component is configured to removably affix to the electrical connector;
   a second component including a protrusion, wherein the first component is disposed on top of the second component and wherein the protrusion limits a range of motion of the snap in a direction of the second component.

2. The fastener of claim 1, wherein the second component includes one or more alignment posts.

3. The fastener of claim 2, wherein the first component includes one or more alignment apertures that are configured to receive the one or more alignment posts.

4. The fastener of claim 1, wherein the protrusion includes a first end and a second end and wherein a height of the protrusion at the second end is greater than a height of the protrusion at the first end.

5. The fastener of claim 1, wherein the first component includes an aperture disposed beneath a portion of the snap and wherein at least a portion of the protrusion is configured to extend through the aperture.

6. The fastener of claim 5, wherein the protrusion includes a first end and a second end and wherein a width of the protrusion at the second end is greater than a width of the protrusion at the first end.

7. The fastener of claim 6, wherein the aperture has a tapered shape and wherein the first end of the protrusion and the second end of the protrusion are configured to contact sides of the aperture to aid in alignment of the snap with the protrusion.

8. A vehicle comprising:
   a fastener for electrical connector, the fastener comprising:
   a first component including a snap, an engagement surface and a connector, wherein the first component is configured to removably affix to the electrical connector;

a second component including a protrusion, wherein the first component is disposed on top of the second component and wherein the protrusion limits a range of motion of the snap in a direction of the second component.

9. The vehicle of claim 8, wherein the second component includes one or more alignment posts.

10. The vehicle of claim 9, wherein the first component includes one or more alignment apertures that are configured to receive the one or more alignment posts.

11. The vehicle of claim 8, wherein the protrusion includes a first end and a second end and wherein a height of the protrusion at the second end is greater than a height of the protrusion at the first end.

12. The vehicle of claim 8, wherein the first component includes an aperture disposed beneath a portion of the snap and wherein at least a portion of the protrusion is configured to extend through the aperture.

13. The vehicle of claim 12, wherein the protrusion includes a first end and a second end and wherein a width of the protrusion at the second end is greater than a width of the protrusion at the first end.

14. The vehicle of claim 13, wherein the aperture has a tapered shape and wherein the first end of the protrusion and the second end of the protrusion are configured to contact sides of the aperture to aid in alignment of the snap with the protrusion.

15. A fastener for an electrical connector of a vehicle comprising:
a first component including a snap, an engagement surface and a connector, wherein the first component is configured to removably affix to the electrical connector;
a second component including a protrusion, wherein the first component is disposed on top of the second component and wherein the protrusion limits a range of motion of the snap in a direction of the second component,
wherein the snap has a first end connected to the first component and a second end adjacent the engagement surface and wherein the snap has a height that increases from the first end to the second end.

16. The fastener of claim 15, wherein the snap has a width that increases from the first end to the second end.

17. The fastener of claim 15, wherein the protrusion includes a first end and a second end and wherein a height of the protrusion at the second end is greater than a height of the protrusion at the first end.

18. The fastener of claim 15, wherein the first component includes an aperture disposed beneath a portion of the snap and wherein at least a portion of the protrusion is configured to extend through the aperture.

19. The fastener of claim 18, wherein the protrusion includes a first end and a second end and wherein a width of the protrusion at the second end is greater than a width of the protrusion at the first end.

20. The fastener of claim 19, wherein the aperture has a tapered shape and wherein the first end of the protrusion and the second end of the protrusion are configured to contact sides of the aperture to aid in alignment of the snap with the protrusion.

* * * * *